Sept. 13, 1932.   A. W. SIMMONS   1,877,257
BEARING STRUCTURE
Original Filed Dec. 15, 1928   3 Sheets-Sheet 1
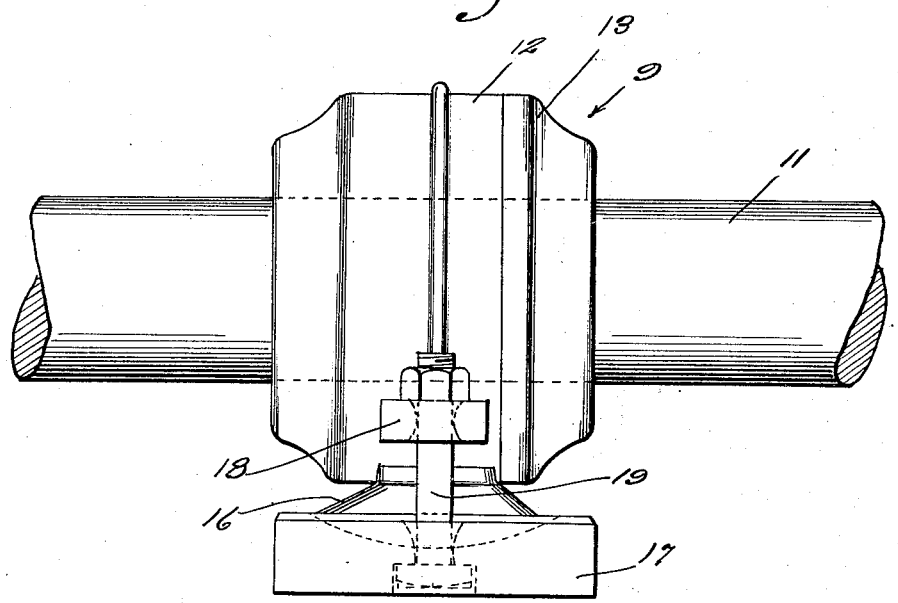
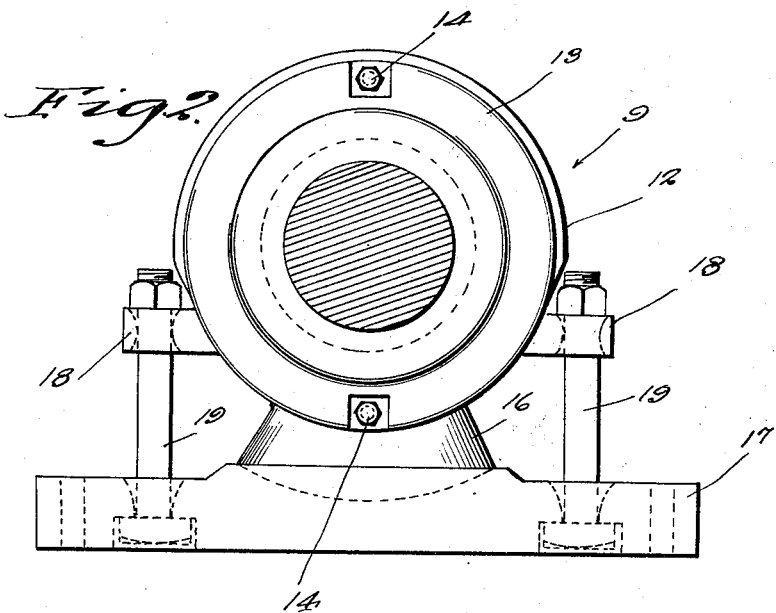
Inventor
A. W. Simmons
By Clarence A. O'Brien
Attorney

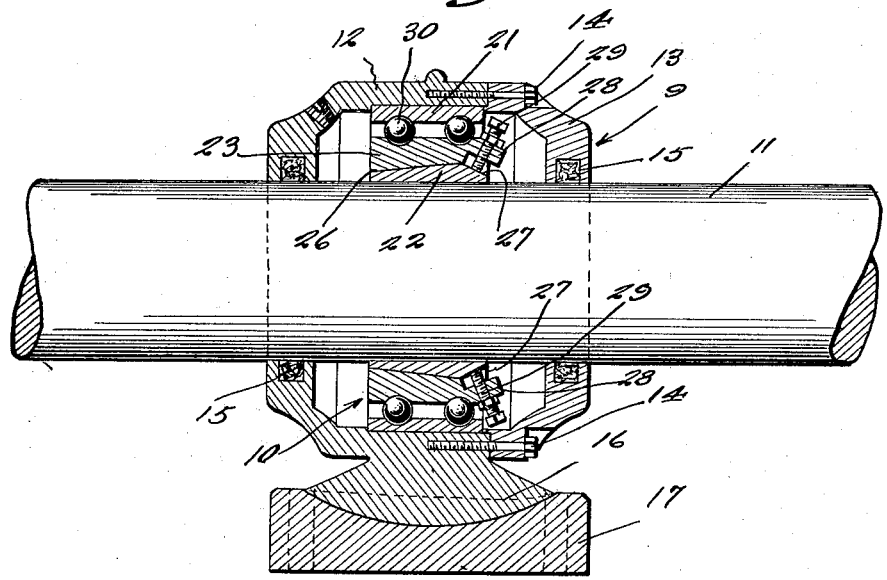
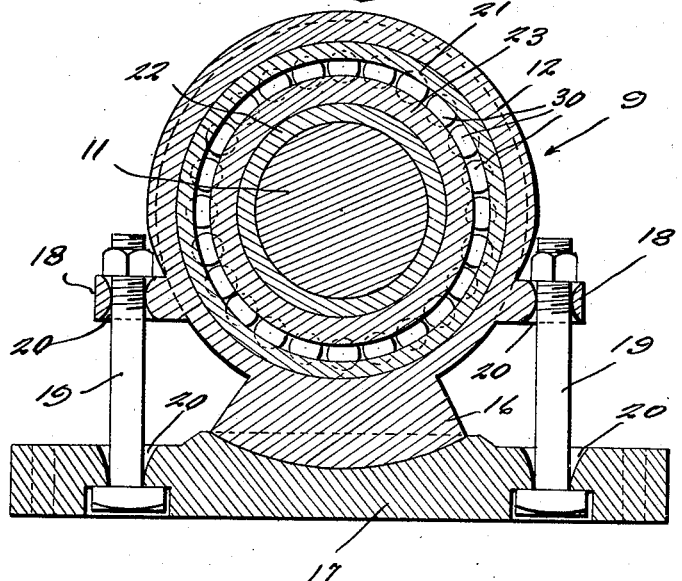

Patented Sept. 13, 1932

1,877,257

UNITED STATES PATENT OFFICE

ARTHUR W. SIMMONS, OF NACOGDOCHES, TEXAS

BEARING STRUCTURE

Application filed December 15, 1928, Serial No. 326,271. Renewed January 26, 1932.

This invention relates to an improved bearing structure and it has more particular reference to a contribution to this art, which is distinguished by two principal parts; namely, an improved sectional and adjustable bearing for a shaft, an independently adjustable housing or casing therefor.

My principal aim is to generally improve upon prior patented and marketed bearings of the type embodying rollers or balls, by providing a novel organization of parts which, it is believed, is a mechanical achievement in the art, and which is characterized by such indispensable features as efficiency, in performance, strength and durability, economy, positive and dependable results, and which is capable of fulfilling the requirements of an invention of this class in an unusually satisfactory and suitable manner.

That part of the invention hereinafter mentioned as the bearing per se is individualized by a novel inner race, embodying a split bushing embracing the shaft and a surrounding annulus having adjustable cooperation therewith to provide for conformity and accurate adjustment from time to time to compensate for wear and to facilitate initial assembly and subsequent repairs.

The housing is made more practicable and modern in design in that it is associated with a supporting base through the medium of a universal joint permitting adjustment and maintenance of the housing with respect to the base in a manner to render the shaft substantially self-aligning.

Other features and advantages of the invention will become more readily apparent from the following description and drawings.

In the drawings:

Figure 1 is a side elevational view of the complete bearing structure made in accordance with the present invention.

Figure 2 is an end view of Figure 1.

Figure 3 is a central vertical sectional view, through Figure 1, showing the internal arrangement of details.

Figure 4 is a cross section at right angles to Figure 3.

Figure 5:
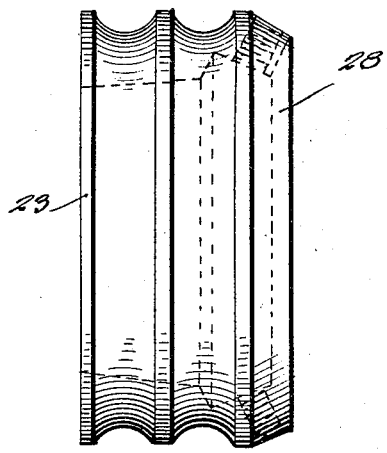
Figure 5 is an elevational view of the annulus of the inner race.

In the drawings, wherein like numerals are employed to designate like parts throughout the same, the reference numerals 9 designate generally the housing or casing, in which the improved sectional bearing 10 is confined, and 11 designates the shaft journaled for rotation in the bearing and housing.

The housing comprises a hollow box like casing including a stationary body 12, and a removable cap 13, fastened to the body through the medium of retaining bolts 14 and removable to permit access to be had to the interior of the housing. These parts 12 and 13 are formed with aligned openings for passage of the shaft 11, and packing rings 15 are arranged in grooves surrounding the openings to provide sight closures. The body 12 is provided at its bottom with an integral extension 16, functioning as a rest and provided with a convex or part-spherical surface, designed for universal joint reception in a concavity formed in the base 17. As shown in Figure 4, the body 12 is provided with substantially diametrically opposite outstanding lugs 18 disposed above bolt holes in the base, and connecting bolts 19 are provided for effecting a connection between the housing and base, such as permits freedom of movement of the universal joints to permit self aligning of the shaft 11. In the representation in Figure 4, the headed ends of the bolt are located in recesses, while the screw threaded end portions extend through bolt holes in the lugs 18. The bolt holes in both the face and in the lug are enlarged as at 20 to permit angling of the bolts and relative movement of the housing with respect to the base to produce the desired self-aligning feature of the invention.

Figure 6:
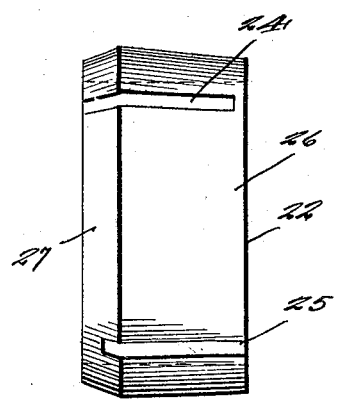
Figure 6 is an elevational view of the especially designed resilient split bushing.
Figure 7:
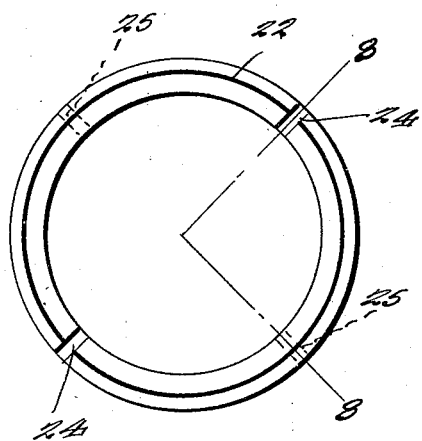
Figure 7 is an edge or end elevational view of the bushing.
Figure 8:
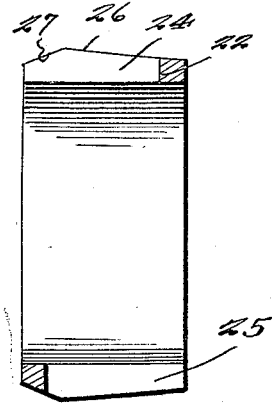
Figure 8 is a sectional view, taken approximately upon the plane of the line 8—8 of Figure 7.

Analyzing now the improved bearing 10, attention is invited to the assembly seen in Figure 3. It comprises an outer race 21, clamped between the body 12 and the cap 13, by the aforesaid bolts 14. This bearing is of the usual construction. The inner race, however, is distinctive, in that it includes an especially designed bushing 22, and a complemental surrounding annulus 23. The bushing 22, as shown in Figures 6 to 8 inclusive is provided with two pairs of slots 24 and 25, respectively. The slots 24 open through one edge of the bushing, while the slots 25 open through the opposite edge, and they are disposed in alternate relationship. Thus, a resilient bushing is had. The outer periphery is provided with relatively wide and narrow bevelled surfaces 26 and 27 respectively. The inner peripheral surface of the annulus 23 has a relatively wide bevelled surface which corresponds to and cooperates with the surface 26 of the bushing. Moreover, it is formed with an outstanding circumferential flange 28, assuming an angular inclination, corresponding to the inclination of the complemental bevels 27. This flange carries adjusting screws 29, co-acting with the bevels 27. Incidentally the screws are provided with jam nuts. It is obvious that this arrangement permits adjusting of the bushing 22 to compensate for wear and to allow for irregularities and to conform to the surface of the shaft against which it is bound. The bevelled surfaces of the bushing 22 and the complemental bevelled surface and flange of the annulus 23, together with the cooperating screws, produces a desirable cam action for contacting the resilient portion or sectors against the shaft.

In practice, anti-friction balls or equivalent elements 30 are interposed between the inner and outer races 23 and 21, respectively, and are preferably confined in annular grooves or race ways.

A bearing of this type is extremely practical to use in transmission machinery, although it is equally well adapted to other uses. It is obvious that this construction provides simplicity and economical manufacture, quick assembly, subsequent repair, and endurance and proper adjustment. It is thought however, that these advantages and others will be quite apparent after carefully considering the description in conjunction with the drawings.

Therefore a more lengthy description is regarded as unnecessary.

Minor changes in shape, size, and rearrangement of details coming within the field of invention claimed may be resorted to, in actual practice, if desired.

I claim:

1. In a bearing structure of the class described, an outer ring like race, an inner complemental race embodying a bushing and a surrounding annulus, said bushing having an inner concentric opening for passage around a shaft, the outer periphery of said bushing being provided with oppositely directed circumferential bevels, said bushing being formed with slots dividing it into relatively adjustable resilient portions, said annulus having a bevelled inner periphery for cooperation with one of the bevels on said bushing, and adjusting screws carried by said annulus and cooperable with the remaining bevels on the bushing for shifting the annulus longitudinally thereon.

2. In a bearing structure of the class described, an outer ring like race, an inner complemental race embodying a bushing and a surrounding annulus, said bushing having an inner concentric opening for passage around a shaft, the outer periphery of said bushing being provided with oppositely directed circumferential bevels, said bushing being formed with slots dividing it into relatively adjustable resilient portions, said annulus having a bevelled inner periphery for cooperation with one of the bevels on said bushing, adjusting screws carried by said annulus and cooperable with the remaining bevels on the bushing for shifting the annulus longitudinally thereon, said adjusting screws being supported at oblique angles with respect to the central axis of the bearing.

3. In a bearing structure of the class described, a ring like outer race, an inner race, an anti-friction element interposed between said races, said inner race having its outer periphery formed with circumferential relatively wide and narrow bevels, said bushing being further formed with pairs of transversely disposed slots arranged in diametrically opposite pairs and opening through the opposite edges of the bushing in an alternate manner, and a surrounding annulus cooperable with said bushing and having its inner periphery provided with a relatively wide bevel cooperable with the aforesaid wide bevel, and a circumferential inwardly inclined flange surrounding said narrow bevel in spaced relation, and adjusting screws carried by said flange and engageable with said narrow bevel for shifting the annulus longitudinally on the bushing.

In testimony whereof I affix my signature.

ARTHUR W. SIMMONS.